US008625928B2

(12) United States Patent
Fukushi

(10) Patent No.: US 8,625,928 B2
(45) Date of Patent: Jan. 7, 2014

(54) INFORMATION PROCESSING APPARATUS, INFORMATION PROCESSING METHOD, AND PROGRAM THEREFOR

(75) Inventor: Gakuho Fukushi, Tokyo (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 12/985,836

(22) Filed: Jan. 6, 2011

(65) Prior Publication Data

US 2011/0176731 A1 Jul. 21, 2011

(30) Foreign Application Priority Data

Jan. 19, 2010 (JP) .............................. P2010-009452

(51) Int. Cl.
*G06K 9/36* (2006.01)
(52) U.S. Cl.
USPC ........................................................ 382/284
(58) Field of Classification Search
None
See application file for complete search history.

(56) References Cited

U.S. PATENT DOCUMENTS

| | | | | | |
|---|---|---|---|---|---|
| 5,577,131 | A | * | 11/1996 | Oddou | 382/173 |
| 6,549,681 | B1 | * | 4/2003 | Takiguchi et al. | 382/294 |
| 6,707,934 | B1 | * | 3/2004 | Takeda et al. | 382/124 |
| 6,714,689 | B1 | * | 3/2004 | Yano et al. | 382/284 |
| 6,751,341 | B2 | * | 6/2004 | Oosawa | 382/132 |
| 2008/0181494 | A1 | * | 7/2008 | Watanabe et al. | 382/167 |
| 2010/0303364 | A1 | * | 12/2010 | Yamada | 382/201 |
| 2011/0058715 | A1 | * | 3/2011 | Doering et al. | 382/128 |
| 2011/0075945 | A1 | * | 3/2011 | Yamaji | 382/284 |

FOREIGN PATENT DOCUMENTS

| | | |
|---|---|---|
| JP | 07-174538 | 7/1995 |
| JP | 9-91410 | 4/1997 |
| JP | 2002-305647 | 10/2002 |
| JP | 2004-072685 | 3/2004 |
| JP | 2007-024764 | 2/2007 |

OTHER PUBLICATIONS

Cross-correlation, (Dec. 16, 2009), Wikipedia.*
Japanese Office Action issued Aug. 27, 2013 for corresponding Japanese Appln. No. 2010-009452.

* cited by examiner

*Primary Examiner* — David Zarka
*Assistant Examiner* — Carol Wang
(74) *Attorney, Agent, or Firm* — K&L Gates LLP

(57) ABSTRACT

An information processing apparatus includes a generation section, a selection section, a matching processing section, and a calculation section. The generation section generates source image blocks obtained by dividing a connection area of a source image into areas, and template image blocks obtained by dividing a connection area of a template image into areas, the connection area of the template image being superimposed on the connection area of the source image. The selection section selects target image blocks as targets individually subjected to matching processing, based on luminance information of each template image block. The matching processing section calculates relative position information of corresponding image blocks as images corresponding to the target image blocks and the target image blocks. The calculation section calculates relative position shift information of the connection area of the source image and that of the template image based on the relative position information.

7 Claims, 14 Drawing Sheets

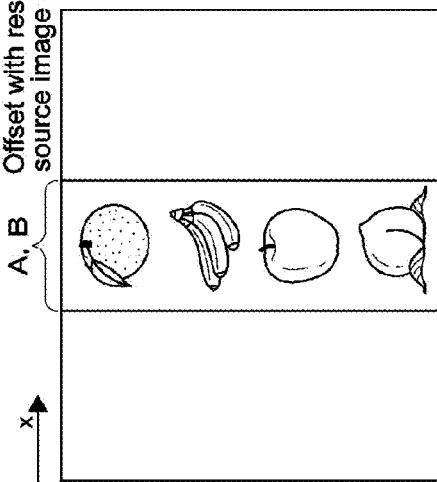
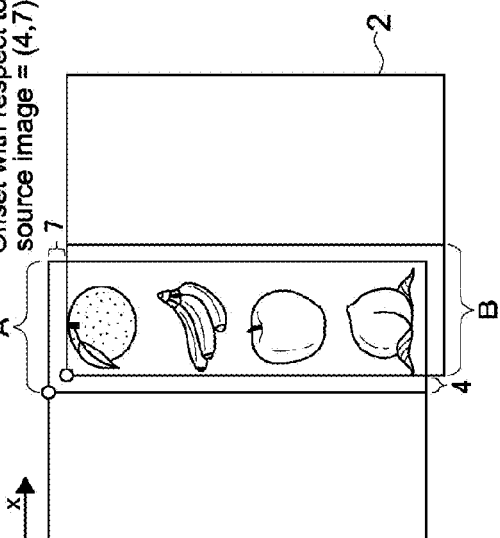
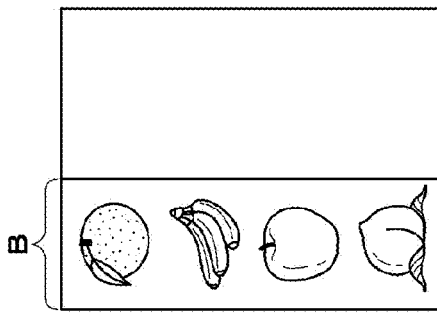
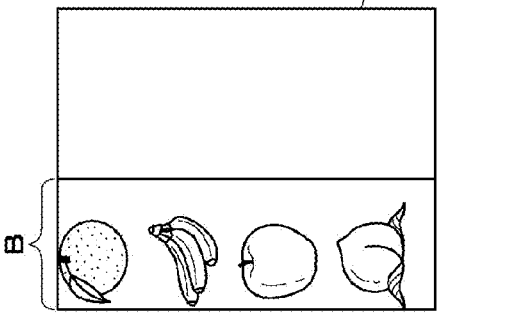
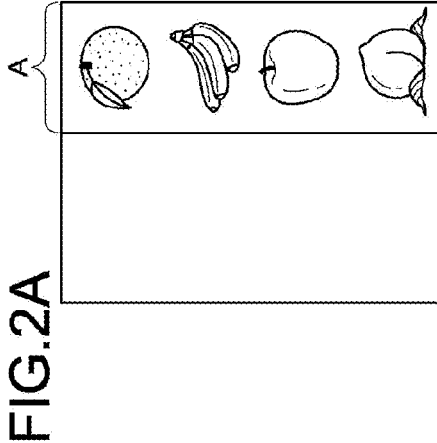
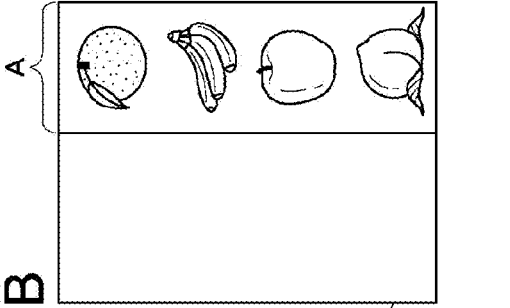
FIG.2A FIG.2B

FIG.9A

| Cumulative offset value | Tolerance ±0 |
|---|---|
| Previous time ⇒ This time | Judgment |
| (4,5) ⇒ (4,5) | Not changed |
| (4,5) ⇒ (4,6) | Changed |
| (4,5) ⇒ (3,6) | Changed |
| (4,5) ⇒ (2,6) | Changed |

FIG.9B

| Cumulative offset value | Tolerance ±1 |
|---|---|
| Previous time ⇒ This time | Judgment |
| (4,5) ⇒ (4,5) | Not changed |
| (4,5) ⇒ (4,6) | Not changed |
| (4,5) ⇒ (3,6) | Not changed |
| (4,5) ⇒ (2,6) | Changed |

FIG.9C

| Cumulative offset value | Tolerance ±2 |
|---|---|
| Previous time ⇒ This time | Judgment |
| (4,5) ⇒ (4,5) | Not changed |
| (4,5) ⇒ (4,6) | Not changed |
| (4,5) ⇒ (3,6) | Not changed |
| (4,5) ⇒ (2,6) | Not changed |

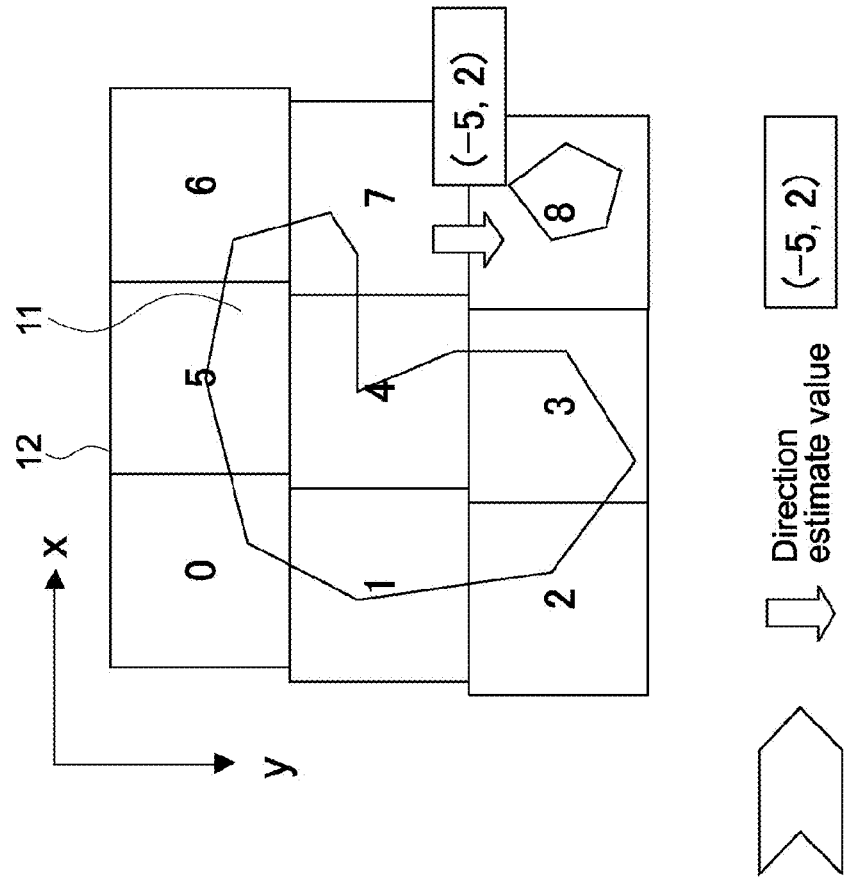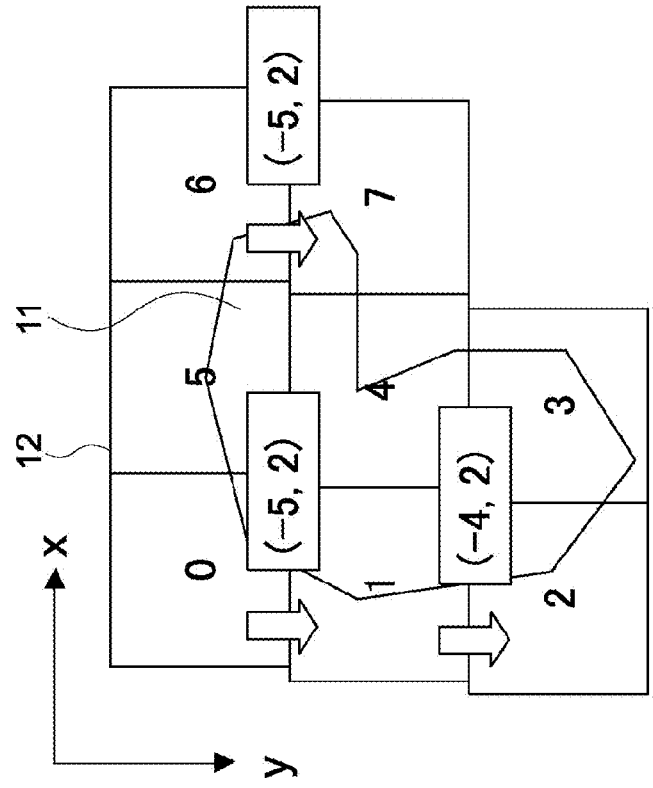

FIG. 13C
| index | This embodiment | | | Comparative example | |
|---|---|---|---|---|---|
| | Final offset value | Calculation time period (s) | blk | Final offset value | Calculation time period (s) |
| 1 | (−2, 1) | 0.087 | 3 | (−2, 1) | 0.943 |
| 2 | (−2, −1) | 0.080 | 3 | (−2, −1) | 0.941 |
| 3 | (0, 2) | 0.080 | 3 | (0, 3) | 0.738 |
| 4 | (2, 1) | 0.080 | 3 | (2, 1) | 0.968 |
| 5 | (2, 0) | 0.080 | 3 | (2, 0) | 0.961 |
| 6 | (3, 6) | 0.081 | 3 | (3, 6) | 0.700 |
| 7 | (−2, 0) | 0.081 | 3 | (−2, 0) | 0.960 |
| 8 | (−2, 0) | | | (−2, 0) | 0.940 |
| Total | | 0.648 | | | 7.151 |
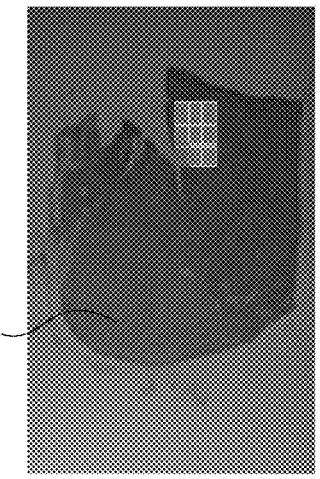
FIG. 13A
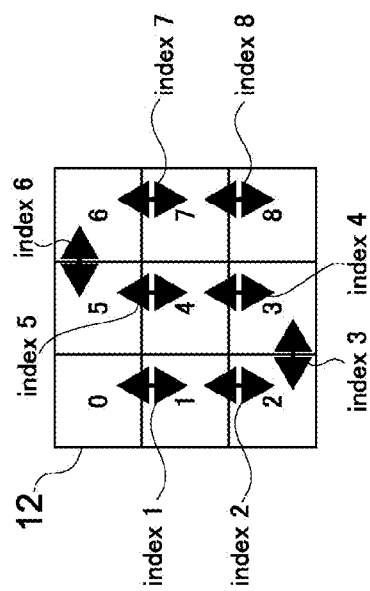
FIG. 13B 4.72
Without texture 22.70
With texture 23.15
With texture

INFORMATION PROCESSING APPARATUS, INFORMATION PROCESSING METHOD, AND PROGRAM THEREFOR

CROSS REFERENCES TO RELATED APPLICATIONS

The present application claims priority to Japanese Priority Patent Application JP 2010-009452 filed in the Japan Patent Office on Jan. 19, 2010, the entire content of which is hereby incorporated by reference.

BACKGROUND

The present application relates to an information processing apparatus, an information processing method, and a program therefor that are capable of combining a plurality of images.

From the past, there is known a stitching technique of connecting a plurality of images having physically continuous information, and the stitching technique is used for panoramic photography, photographing of microscope images, or the like. In the stitching technique, it is important to appropriately set a mutual positional relationship between a plurality of images to be connected to one another.

For example, processing such as template matching is performed on the entire area in which the plurality of images are superimposed on one another, and accordingly an offset value for setting an optimum mutual positional relationship between the plurality of images to be connected is calculated.

Further, for example, Japanese Patent Application Laid-open No. Hei 09-91410 (hereinafter, referred to as Patent Document 1; see paragraphs [0054] to [0071], FIGS. 10 and 11, and the like) discloses a panorama image synthesis system in which a synthesis parameter for connecting a plurality of images is set as follows. First, as shown in FIG. 11 of Patent Document 1, coincidence points in two images 91 and 92 to be connected are designated by a user as user designation points 93 and 94, respectively. Next, a search range 95 with the user designation point 94 as the center on the image 92 is defined. Then, a template image cut out with the user designation point 93 on the image 91 as the center is superimposed within the search range 95 and a difference in a pixel unit is calculated. A point at which the sum of the differences is minimum is calculated as a true corresponding point between the images 91 and 92, and the synthesis parameter described above is calculated based on the calculated true corresponding point.

SUMMARY

However, in a case where the processing described above is performed on the entire area in which a plurality of images are superimposed on each other, an amount of computation is increased and a processing time period necessary for synthesis of images becomes long. In addition, in the panorama image synthesis system disclosed in Patent Document 1, a user designates user designation points, and a true corresponding point between the images 91 and 92 is calculated based on the user designation points. Therefore, a burden on the user is increased.

In view of the circumstances as described above, it is desirable to provide an information processing apparatus, an information processing method, and a program therefor that are capable of connecting a plurality of images in a short processing time period and with less burden on a user.

According to an embodiment, there is provided an information processing apparatus including a generation means, a selection means, a matching processing means, and a calculation means.

The generation means generates a plurality of source image blocks obtained by dividing a connection area of a source image into a plurality of areas, and a plurality of template image blocks obtained by dividing a connection area of a template image into a plurality of areas, the connection area of the template image being superimposed on the connection area of the source image.

The selection means selects a plurality of target image blocks as targets individually subjected to matching processing, based on luminance information of each of the template image blocks generated by the generation means.

The matching processing means calculates, by performing the matching processing on corresponding image blocks as images corresponding to the plurality of target image blocks selected by the selection means, in the plurality of source image blocks generated by the generation means, and the plurality of target image blocks, relative position information of the corresponding image blocks and the target image blocks.

The calculation means calculates relative position shift information of the connection area of the source image and the connection area of the template image, based on the relative position information calculated by the matching processing means.

In the information processing apparatus, the connection area of the source image and the connection area of the template image to be superimposed thereon are each divided into the plurality of areas, and the plurality of source image blocks and the plurality of template image blocks are generated. Then, the target image blocks are selected from the plurality of template image blocks, and the relative position information of the target image blocks and the corresponding image blocks is calculated. Based on the position information, the relative position shift information of the connection area of the source image and the connection area of the template image is calculated. Accordingly, the matching processing for the entire connection areas superimposed on each other, and the designation of coincide points by a user are unnecessary, with the result that the source image and the template image can be connected to each other appropriately with less burden on the user and in a short processing time period.

The generation means may generate the plurality of template image blocks that correspond to the plurality of source image blocks and have a smaller size than that of the plurality of source image blocks.

In this case, the matching processing means may generate a correlation coefficient that is based on luminance information of each of the corresponding image blocks and luminance information of each of the target image blocks in accordance with a position of each of the target image blocks within each of the corresponding image blocks, to thereby perform the matching processing, and calculate the generated correlation coefficient as the relative position information.

Further, the calculation means may calculate the relative position shift information by cumulatively adding the correlation coefficients of the target image blocks, the correlation coefficients being calculated by the matching processing means.

In the information processing apparatus, as the relative position information of the corresponding image block and the target image block, the correlation coefficients are calculated. The correlation coefficients are cumulatively added, with the result that the relative position shift information of the connection area of the source image and the connection area of the template image can be predicted, and the position shift information with high accuracy can be calculated in a short processing time period.

The calculation means may generate tentative position shift information by cumulatively adding the correlation coefficients of the target image blocks, and calculate, when the tentative position shift information included in a tolerance set in advance is generated continuously by a predetermined number of times, the tentative position shift information included in the tolerance as the relative position shift information.

In the information processing apparatus, the correlation coefficients are cumulatively added, with the result that the tentative position shift information is generated. When the generated tentative position shift information meets the above condition, the tentative position shift information is calculated as final position shift information. By setting the above condition as appropriate, it is possible to set the accuracy of the calculated position shift information, duration of the processing time period, or the like as appropriate.

The selection means may calculate a standard deviation value of luminance values for each of the template image blocks, and select the template image blocks having the standard deviation value equal to or larger than a predetermined threshold value, as the target image blocks.

By selecting the target image blocks based on the standard deviation value, it is possible to select optimum target image blocks for the matching processing. Accordingly, the position information with high reliability is calculated, with the result that the position shift information can be calculated accurately in a short time period.

The selection means may give a first priority order to the template image block having a first standard deviation value, the first priority order representing a priority for which the matching processing is performed by the matching processing means, give a second priority order to the template image block having the standard deviation value smaller than the first standard deviation value, the second priority order having the priority lower than the first priority order, and select the template image block to which the first priority order is given and the template image block to which the second priority order is given, as the target image blocks.

Accordingly, the position information with high reliability is selected first, with the result that the position shift information can be calculated accurately in a short time period.

The selection means may select a first template image block and a second template image block that is separated from the first template image block by a predetermined distance or more in the connection area of the template image, as the target image blocks.

In the information processing apparatus, the first and second template image blocks that are separated from each other in the connection area of the template image by a predetermined distance or more are selected as the target image blocks. Accordingly, the position information is calculated without positional displacement in the connection area. As a result, the position shift information can be calculated accurately based on the calculated position information.

According to an embodiment, there is provided an information processing method executed by an information processing apparatus, the information processing method including the following steps.

Specifically, the information processing apparatus generates a plurality of source image blocks obtained by dividing a connection area of a source image into a plurality of areas, and a plurality of template image blocks obtained by dividing a connection area of a template image into a plurality of areas, the connection area of the template image being superimposed on the connection area of the source image.

A plurality of target image blocks are selected as targets individually subjected to matching processing, based on luminance information of each of the generated template image blocks.

By performing the matching processing on corresponding image blocks as images corresponding to the selected target image blocks, in the generated source image blocks, and the plurality of target image blocks, relative position information of the corresponding image blocks and the target image blocks is calculated.

Relative position shift information of the connection area of the source image and the connection area of the template image is calculated based on the calculated relative position information.

According to an embodiment, there is provided a program causing an information processing apparatus to execute the information processing method described above. The program may be recorded on a recording medium.

According to an embodiment, there is provided an information processing apparatus including a generation section, a selection section, a matching processing section, and a calculation section.

The generation section is configured to generate a plurality of source image blocks obtained by dividing a connection area of a source image into a plurality of areas, and a plurality of template image blocks obtained by dividing a connection area of a template image into a plurality of areas, the connection area of the template image being superimposed on the connection area of the source image.

The selection section is configured to select a plurality of target image blocks as targets individually subjected to matching processing, based on luminance information of each of the template image blocks generated by the generation section.

The matching processing section is configured to calculate, by performing the matching processing on corresponding image blocks as images corresponding to the plurality of target image blocks selected by the selection section, in the plurality of source image blocks generated by the generation section, and the plurality of target image blocks, relative position information of the corresponding image blocks and the target image blocks.

The calculation section is configured to calculate relative position shift information of the connection area of the source image and the connection area of the template image, based on the relative position information calculated by the matching processing section.

As described above, according to an embodiment, it is possible to connect a plurality of images to one another with less burden on a user and in a short processing time period.

These and other objects, features and advantages of the present application will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 2 are diagrams for explaining stitching processing for digital images, in which an operation of a PC according to the first embodiment is explained;

FIG. 9 are diagrams for explaining parameters used for judging stability of the cumulative offset value according to the first embodiment;

FIG. 12 are diagrams for explaining the processing of statistical value management shown in FIG. 10;

FIG. 13 are diagrams showing processing results of stitching processing according to a second embodiment, and those of stitching processing as Comparative example.

DETAILED DESCRIPTION

Embodiments of the present application will be described below in detail with reference to the drawings.

Hereinafter, an embodiment will be described with reference to the drawings.

(First Embodiment)

[Structure of Information Processing Apparatus]

Figure 1:
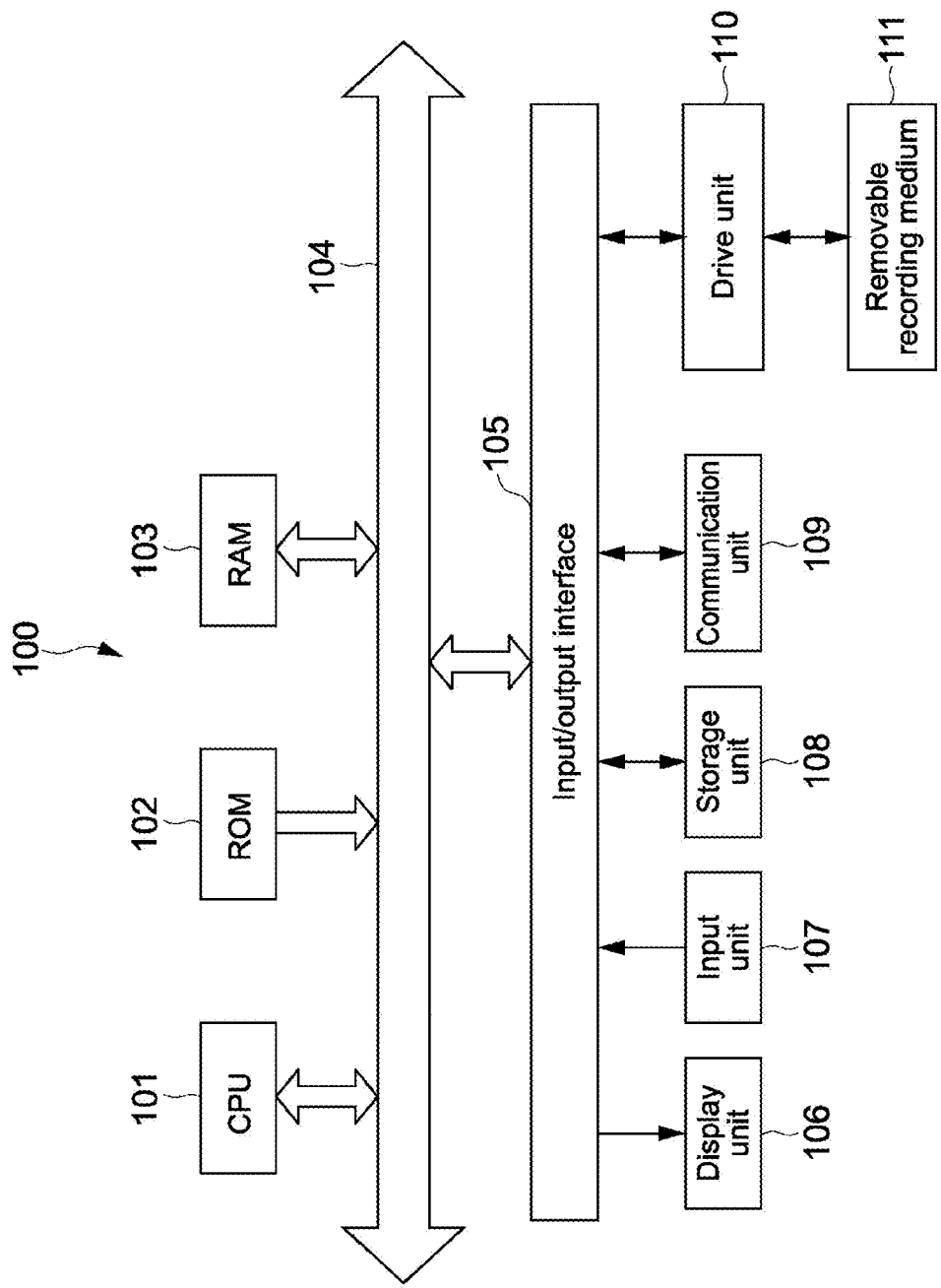
FIG. 1 is a block diagram showing the structure of an information processing system including at least an information processing apparatus according to a first embodiment.

FIG. 1 is a block diagram showing the structure of an information processing system including at least an information processing apparatus according to a first embodiment. As the information processing apparatus, for example, a PC (Personal Computer) 100 is used.

The PC 100 includes a CPU (Central Processing Unit) 101, a ROM (Read Only Memory) 102, a RAM (Random Access Memory) 103, an input/output interface 105, and a bus 104 that connects those components.

To the input/output interface 105, a display unit 106, an input unit 107, a storage unit 108, a communication unit 109, a drive unit 110, and the like are connected.

The display unit 106 is a display device using, for example, liquid crystal, EL (Electro-Luminescence), or a CRT (Cathode Ray Tube).

The input unit 107 is, for example, a pointing device, a keyboard, a touch panel, or other operation apparatus. In a case where the input unit 107 includes a touch panel, the touch panel can be integrated with the display unit 106.

The storage unit 108 is a nonvolatile storage device such as an HDD (Hard Disk Drive), a flash memory, and other solid-state memory.

The drive unit 110 is a device capable of driving a removable recording medium 111 such as an optical recording medium, a floppy disk (registered trademark), a magnetic recording tape, and a flash memory. In contrast to this, the storage unit 108 is often used as a device that mainly drives a non-removable recording medium and is incorporated in the PC 100 in advance.

The communication unit 109 is a modem, a router, or other communication device that is connectable to a LAN (Local Area Network), a WAN (Wide Area Network), or the like, and is used for communicating with other devices. The communication unit 109 may perform wireless or wired communication. The communication unit 109 is used independently from the PC 100 in many cases.

[Operation of Information Processing Apparatus]

To describe the operation of the PC 100 of this embodiment, first, stitching processing for digital images will be described. FIG. 2 are diagrams for explaining the stitching processing.

The stitching processing is processing of appropriately connecting a source image 1 and a template image 2 that have physically continuous information, as shown in FIGS. 2A and 2B. The source image 1 has an overlap image A as a connection area, and the template image 2 has an overlap image B as a connection area. The source image 1 and the template image 2 are connected such that the overlap image A and the overlap image B are superimposed on each other.

FIG. 2A shows a case where the overlap images A and B are completely identical to each other as image data. In this case, the overlap images A and B are superimposed on each other as they are with relative positions thereof being not shifted, and thus the source image 1 and the template image 2 are appropriately connected to each other. Accordingly, the information of the relative position shift between the overlap images A and B, that is, an offset value in x and y directions shown in FIG. 2 is (0,0).

FIG. 2B shows a case where the overlap images A and B are not completely identical to each other as image data. For example, due to errors of photographing accuracy, a difference in time at which images are taken, and the like caused when the source image 1 and the template image 2 are photographed, the state as shown in FIG. 2B is caused. In this case, if the relative position shift between the overlap images A and B is not taken into consideration, the source image 1 and the template image 2 are not appropriately connected to each other. In FIG. 2B, an offset value is (4,7), and the overlap image B is shifted from the overlap image A by 4 (pixels) in the x direction and 7 (pixels) in the y direction and superimposed on each other. Accordingly, the source image 1 and the template image 2 are appropriately connected to each other.

With the PC 100 of this embodiment, the offset value described above is calculated. The operation of the PC 100 therefor will be described in detail.

Figure 3:
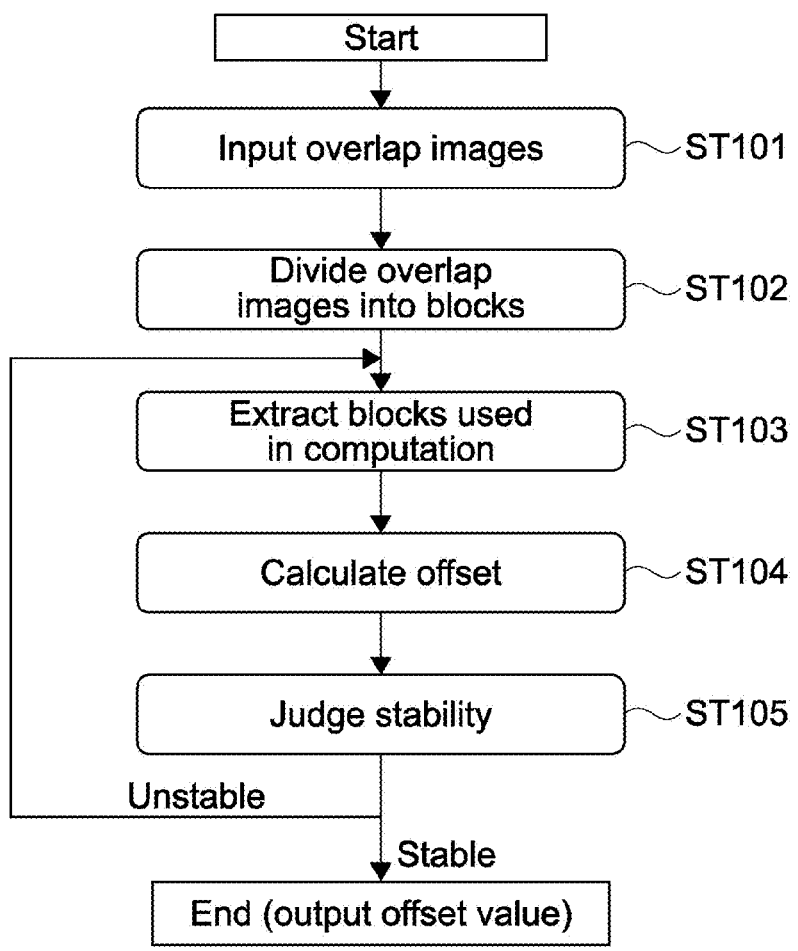
FIG. 3 is a flowchart showing the outline of processing of the PC according to the first embodiment.
Figure 4:
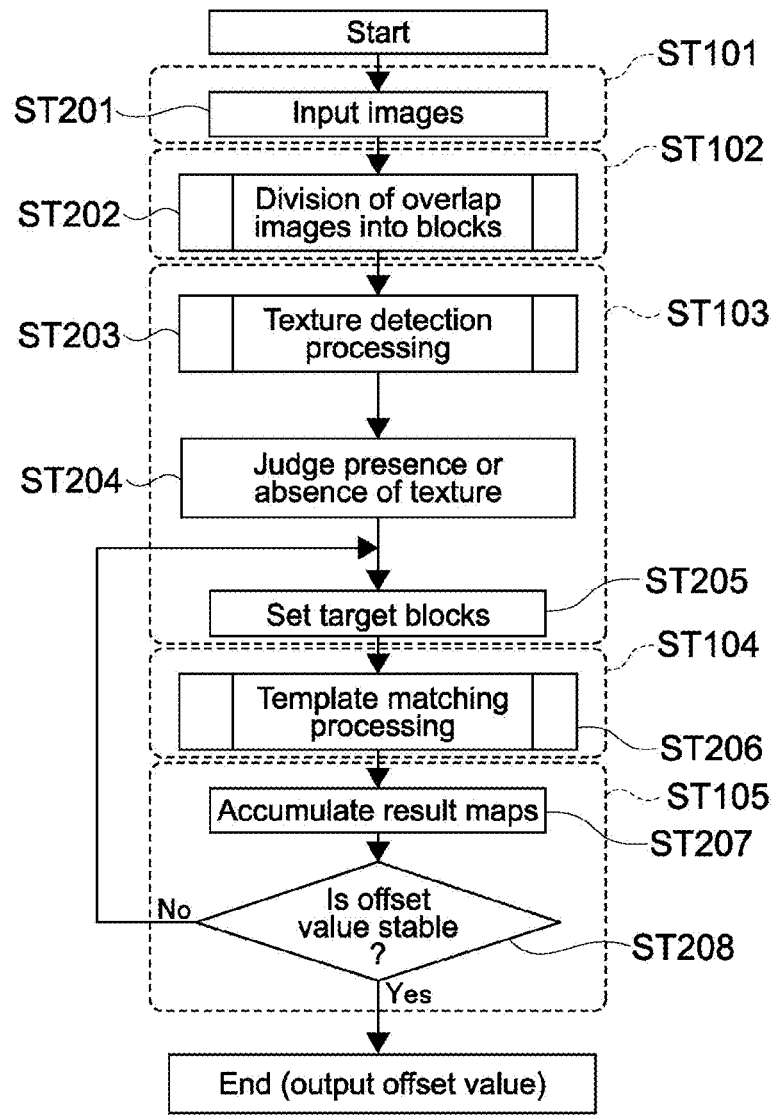
FIG. 4 is a flowchart showing a specific algorithm of each processing shown in FIG. 3.

FIG. 3 is a flowchart showing the outline of processing of the PC 100 as an information processing apparatus according to this embodiment. FIG. 4 is a flowchart showing a specific algorithm of each processing shown in FIG. 3.

The following processing of the PC 100 (each processing section) is realized in cooperation with software stored in the storage unit 108, the ROM 102, or the like and hardware resources of the PC 100. Specifically, the CPU 101 loads a program constituting the software, which is stored in the storage unit 108, the ROM 102, or the like, to the RAM 103, and executes the program, with the result that the following processing is realized.

A source image 1 and a template image 2 to be connected to each other are input by an overlap image input section (Step 101, Step 201). The entire source image 1 and template image 2 may be input, or only an overlap image A of the source image 1 and an overlap image B of the template image 2 may be input.

Each of the overlap images A and B is divided into a plurality of areas by an overlap image block division section (Step 102, Step 202). This processing is referred to as division into blocks, and images obtained by dividing the overlap image A into blocks are referred to as source image blocks. Further, images obtained by dividing the overlap image B into blocks are referred to as template image blocks.

Figure 5:
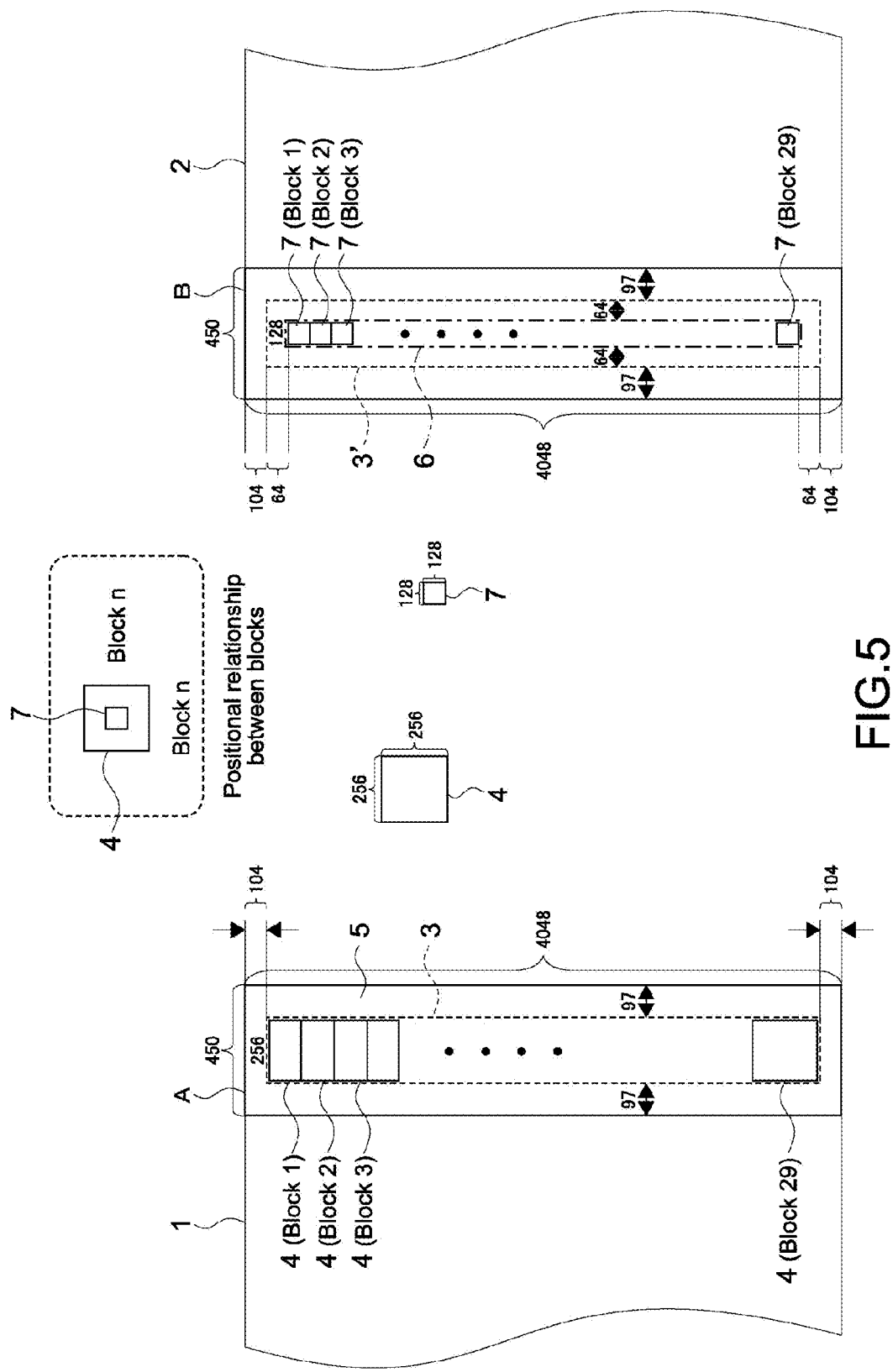
FIG. 5 is a diagram showing source image blocks and template image blocks according to the first embodiment.

FIG. 5 is a diagram showing the source image blocks and the template image blocks. In this embodiment, the overlap images A and B each having a size of 4,048×450 (pixels) are set. Then, a block area 3 located at the center of the overlap image A is divided into blocks, and 29 source image blocks 4 each having a size of 256×256 (pixels) are generated. As shown in FIG. 5, adjacent source image blocks 4 are provided on the overlap image A so that half areas thereof are superimposed on each other.

When a size of each side of the source image block 4 is defined, a size of a margin 5 in the overlap image A is also determined. The margin 5 is allocated equally on the top, bottom, left, and right portions of the overlap image A, and thus the block area 3 is provided at the center of the overlap image A. Accordingly, it is possible to generate the source image blocks 4 while avoiding an edge portion of the overlap image A, in which photographing distortion due to a lens is large. As a result, it is possible to improve the accuracy of an image block offset value that will be described later, which is calculated using the source image blocks 4.

At the center of the overlap image B, a block area 6 whose size is smaller than that of the block area 3 is provided. The block area 6 of the overlap image B is provided so as to be included in an area 3' corresponding to the block area 3 of the overlap image A. Further, the block area 6 is provided at the center of the area 3'. This block area 6 is divided into blocks, and 29 template image blocks 7 each having a size of 128×128 (pixels) are generated.

The source image block 4 and the template image block 7 correspond to each other one for one. FIG. 5 shows a positional relationship between the source image block 4 and the template image block 7 that correspond to each other. This is a positional relationship between image blocks (blocks n), obtained when an offset value is set to (0,0) and the overlap images A and B are superimposed on each other, and the template image block 7 is positioned at the center of the source image block 4.

The size and the number of overlap images A and B, source image blocks 4, and template image blocks 7 described above may be set as appropriate. Further, the positions or the like of the block areas 3 and 6 in the overlap images A and B can also be set as appropriate.

FIG. 5 shows a case where an end portion of the source image 1 on the right-hand side and an end portion of the template image 2 on the left-hand side are connected to each other. However, an end portion of the source image 1 on the left-hand side and an end portion of the template image 2 on the right-hand side may be connected to each other. Alternatively, the template image 2 may be connected to an end portion of the source image 1 on the upper side or the lower side. In this case, the source image blocks 4 and the template image blocks 7 are aligned in a lateral direction viewed in FIG. 5.

A plurality of target image blocks as targets subjected to matching processing with source image blocks 4 corresponding thereto are selected from the template image blocks 7 by an extraction section for blocks used in computation (Step 103).

Figure 6:
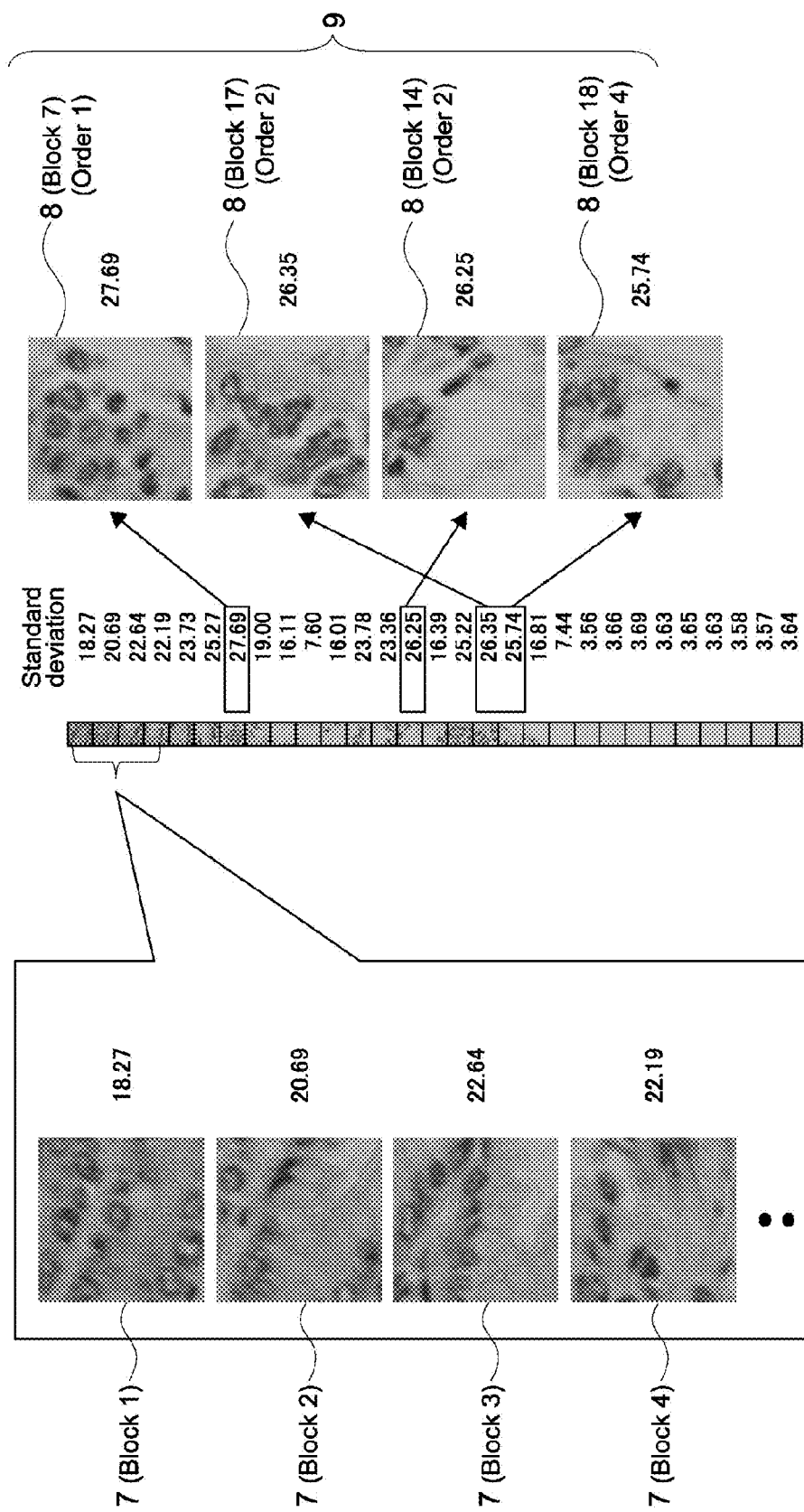
FIG. 6 is a diagram for explaining a method of selecting target image blocks according to the first embodiment.

FIG. 6 is a diagram for explaining a method of selecting target image blocks. In this embodiment, an indicator of "presence of texture" is used for an optimum target image block 8 in the matching processing. Based on the indicator, a standard deviation value of luminance values for each template image block 7 is calculated, and depending on whether the standard deviation value is equal to or larger than a predetermined threshold value, the presence or absence of the texture is judged (Steps 203 and 204). The predetermined threshold value is set to 10.0, for example, and a template image block 7 having a standard deviation value of 10.0 or larger is judged to have texture.

Physically, the standard deviation value of luminance values indicates a degree of discrepancy from an average luminance value of the template image blocks 7. Therefore, a template image block 7 having a standard deviation value equal to or larger than a threshold value is an image having a small number of flat portions and many changes in luminance value in the distribution of luminance values. Accordingly, it can be said that such a template image block 7 has physical characteristics adequate for the matching processing.

A predetermined number of template image blocks 7 having a standard deviation value equal to or larger than a threshold value is set to be a computation candidate block group 9. Then, those template image blocks 7 are sorted out in descending order of standard deviation values, and set as the target image blocks 8 subjected to the matching processing in that order (Step 205).

In FIG. 6, the computation candidate block group 9 is formed of four target image blocks 8. Further, starting with a target image block 8 (block 7) having a larger standard deviation value, the order (1 to 4) representing priority for which the matching processing described below is performed is given. It should be noted that the number of target image blocks 8 constituting the computation candidate block group 9 may be set as appropriate.

The target image block 8 and a corresponding image block as a source image block 4 that corresponds to this target image block 8 are subjected to the matching processing by an offset calculation section. Then, an optimum offset value of the target image block 8 and the corresponding image block is calculated (Step 104, Step 206). In this embodiment, template matching processing is adopted, but other matching processing may be adopted. Hereinafter, the matching processing described above will be described.

The target image block 8 (128×128 (pixels)) is moved within the corresponding image block (256×256 (pixels)), and a correlation coefficient in an area in which the target image block 8 and the corresponding image block are superimposed is calculated. Then, a correlation coefficient at each position within the corresponding image block is stored as a single result map. The single result map is to be relative position information of the corresponding image block and the target image block 8. The correlation coefficient is calculated based on luminance values of the pixels of the corresponding image block and luminance values of the pixels of the target image block 8, by the following expression of a normalized correlation coefficient.

$$R(x, y) = \frac{\sum_{x',y'} T(x', y') \cdot S(x + x', y + y')}{\sqrt{\sum_{x',y'} T(x', y')^2 \cdot \sum_{x',y'} S(x + x', y + y')^2}} \quad \text{[Expression 1]}$$

R(x,y): Coordinates of single result map
T(x,y): Luminance value of pixel of coordinates (x,y) within target image block 8
S(x,y): Luminance value of pixel of coordinates (x,y) within corresponding image block
x'=0 ... w−1
y'=0 ... h−1 (Area in which target image block 8 and corresponding image block are superimposed is set as w×h.)

As to the coordinates (x,y) of each image, in a case where the size of an image is m×m (pixels), the upper left of each image is set to (0,0), and the lower right is set to (m−1,m−1). Accordingly, in this embodiment, up to R (0,0) to R (128, 128), T (0,0) to T (127,127), S (0,0) to S (255,255) are present. Further, both w and h are 128.

The correlation coefficient at each position, stored as a single result map, takes a value of 0 or more and 1 or less. Based on a position whose correlation coefficient is the largest, an image block offset value that is an optimum offset value of the target image block 8 and the corresponding image block is calculated.

Figure 7:
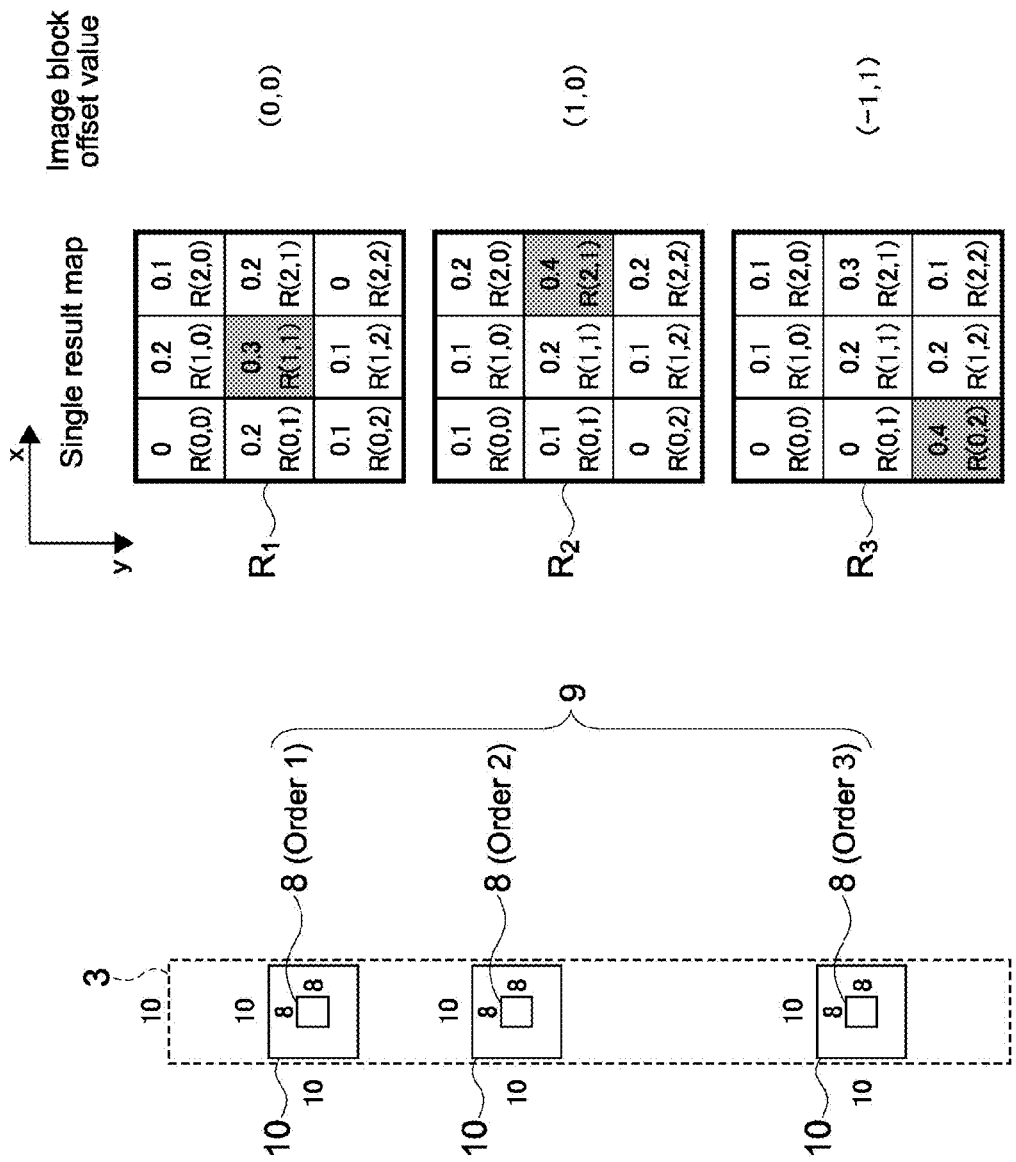
FIG. 7 is a diagram for explaining matching processing of the target image block and a corresponding image block according to the first embodiment in detail.

FIG. 7 is a diagram for explaining the matching processing of the target image block 8 and the corresponding image block described above in detail. For easy understanding of the explanation, in FIG. 7, the size of the corresponding image block 10 (source image block 4) is illustrated in 10×10 (pixels). Further, the size of the target image block 8 (template image block 7) is illustrated in 8×8 (pixels). In addition, here, the computation candidate block group 9 is constituted of three target image blocks 8, and each of the target image blocks 8 is given the order that is based on a standard deviation value of luminance values thereof.

The target image block 8 set as the order 1 and the corresponding image block 10 are subjected to the matching processing, and a single result map $R_1$ shown in FIG. 7 is generated. Correlation coefficients stored as the single result map $R_1$ are as follows.

R(0,0): 0
R(1,0): 0.2
R(2,0): 0.1
R(0,1): 0.2
R(1,1): 0.3
R(2,1): 0.2
R(0,2): 0.1
R(1,2): 0.1
R(2,2): 0

Accordingly, the position at which a correlation coefficient is the highest in the single result map $R_1$ is R(1,1). This position is a relative positional relationship between the target image block 8 and the corresponding image block 10, which is obtained when the offset value is set to (0,0) and the overlap images A and B are superimposed on each other, as described with reference to FIG. 5. In other words, an image block offset value of the target image block 8 set as the order 1 and the corresponding image block 10 is (0,0).

In a single result map $R_2$ generated by the matching processing performed on the target image block 8 set as the order 2 and the corresponding image block 10, R(2,1) has the largest correlation coefficient. Therefore, an image block offset value of the target image block 8 and the corresponding image block 10 is (1,0). An image block offset value of the target image block 8 set as the order 3 and the corresponding image block 10 is (−1,1), from a single result map $R_3$.

It should be noted that as the computation for calculating correlation values stored as the single result maps $R_1$, $R_2$, $R_3$, various computations for judging similarity between image blocks are conceived from a simple one in which a square of a difference of luminance values of pixels in an area in which the target image block 8 and the corresponding image block 10 are superimposed on each other is calculated, to a somewhat complicated one in which a correlation is calculated for a shift from a pixel average value of each image block.

The single result maps $R_1$, $R_2$, $R_3$ as to the respective target image blocks 8 and corresponding image blocks 10 are cumulatively added by a stability judgment section, and cumulative result maps are generated (Step 207). Then, from the generated cumulative result maps, cumulative offset values as tentative position shift information of the overlap images A and B are calculated. It is judged whether the calculated cumulative offset values converge with a predetermined allowable value (Step 105, Step 208). In Step 208, a cumulative offset value judged to be stable is output as a final offset value of the overlap images A and B.

Figure 8:
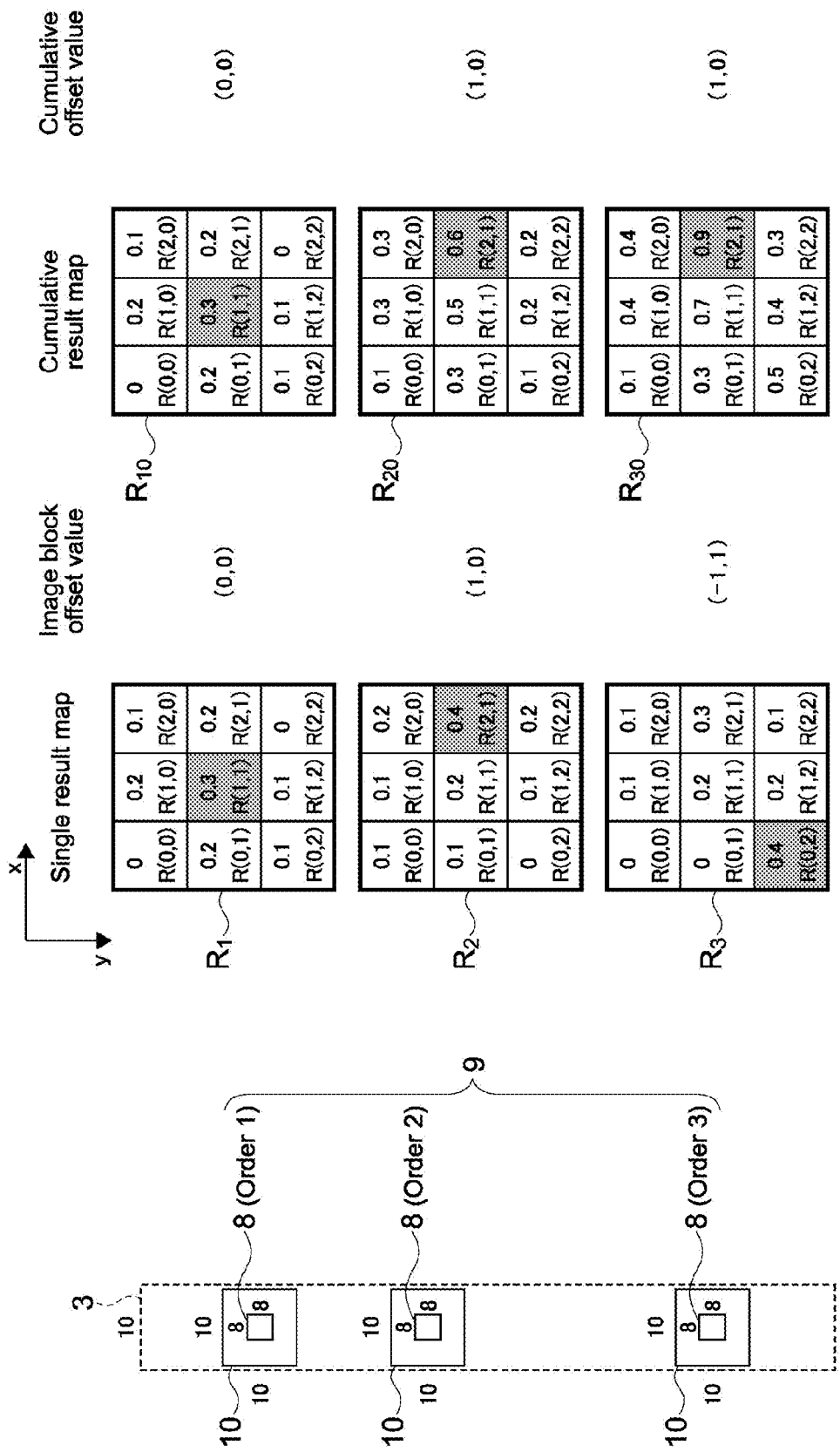
FIG. 8 is a diagram for explaining a cumulative result map and a cumulative offset value according to the first embodiment.

FIG. 8 is a diagram for explaining the cumulative result map and the cumulative offset value. First, the single result map $R_1$ as to the target image block 8 set as the order 1 and the corresponding image block 10 described with reference to FIG. 7 is set as a cumulative result map Rio. Then, a cumulative offset value (0,0) is calculated from a position R(1,1) at which a cumulative correlation coefficient is the largest in the cumulative result map $R_{10}$.

Next, cumulative correlation coefficients at respective positions of the cumulative result map $R_{10}$, and correlation coefficients at respective positions of the single result map $R_2$ as to the target image block 8 set as the order 2 and the corresponding image block 10 are added. Accordingly, a cumulative result map $R_{20}$ is set. A cumulative offset value (1,0) is calculated from a position R(2,1) at which a cumulative correlation coefficient is the largest in the cumulative result map $R_{20}$.

Similarly, correlation coefficients of the cumulative result map $R_{20}$ and the single result map $R_3$ are added, and a cumulative result map $R_{30}$ is set. A position at which a cumulative correlation coefficient is the largest in the cumulative result map $R_{30}$ is R(2,1), and accordingly a cumulative offset value is (1,0). This value is different from the offset value (−1,1) calculated from the single result map $R_3$, and is equal to the cumulative offset value (1,0) calculated from the cumulative result map $R_{20}$. The generation of cumulative result maps and the calculation of cumulative offset values are performed until it is judged that a cumulative offset value is stable.

In the matching processing of the target image block 8 and the corresponding image block 10, there may be a case where the single result maps $R_1$, $R_2$, $R_3$ do not show the same tendency due to local characteristics or the like of each image block. In this regard, the single result maps $R_1$, $R_2$, $R_3$ are cumulatively added and the cumulative result maps $R_{10}$, $R_{20}$, $R_{30}$ are generated. The cumulative result maps $R_{10}$, $R_{20}$, $R_{30}$ have constant converge expectations as compared to the single result maps $R_1$, $R_2$, $R_3$. This is because (an average value of) the cumulative map values obtained by calculating correlation coefficients for all the target image blocks 8 and cumulatively adding those values becomes mathematically substantially equal to a value obtained in a case where correlation coefficients are calculated for the entire overlap images A and B without performing the division into blocks.

For example, a case where a normalized correlation calculation is performed on data (s0, s1, s2, s3) and data (t0, t1, t2, t3) all at once, and a case where the calculation is performed twice for data (s0, s1) and (t0, t1), and data (s2, s3) and (t2, t3) and then results thereof are added, are compared to each other. The expression used in the case where the calculation is performed all at once is as follows.

Normalized correlation coefficient = [Expression 2]

$$\frac{(s0 \cdot t0 + s1 \cdot t1 + s2 \cdot t2 + s3 \cdot t3)}{\sqrt{(s0^2 + s1^2 + s2^2 + s3^2) \cdot (t0^2 + t1^2 + t2^2 + t3^2)}}$$

On the other hand, the expression used in the case where the data is divided into two for the calculation and results thereof are added is as follows.

Normalized correlation coefficient = [Expression 3]

$$\frac{(s0 \cdot t0 + s1 \cdot t1)}{\sqrt{(s0^2 + s1^2) \cdot (t0^2 + t1^2)}} + \frac{(s2 \cdot t2 + s3 \cdot t3)}{\sqrt{(s2^2 + s3^2) \cdot (t2^2 + t3^2)}}$$

The two expressions above include a division by a norm product, so the values do not perfectly coincide with each other but they become very close to each other. Therefore, it is found that the cumulative result maps $R_{10}$, $R_{20}$, $R_{30}$ have constant converge expectations. It should be noted that if it is possible to ignore the influence caused when an absolute value of luminance values in each image block becomes large, the division by a norm product may not be performed and the addition may be performed only in the numerator part. In this case, two values to be calculated perfectly coincide with each other.

As described above, in this embodiment, as relative position information of the corresponding image blocks 10 and the target image blocks 8, the correlation coefficients are stored as the single result maps $R_1$, $R_2$, $R_3$. Then, the correlation coefficients of the single result maps $R_1$, $R_2$, $R_3$ are cumulatively added, with the result that the cumulative result maps $R_{10}$, $R_{20}$, $R_{30}$ are generated. Accordingly, a converge point of the cumulative offset value, which is a final offset value of the overlap image A as the source image 1 and the overlap image B as the template image 2, can be predicted, with the result that a highly-accurate final offset value can be calculated for a short processing time.

In addition, as described above, the template image blocks 7 having a standard deviation value equal to or larger than a predetermined threshold value are selected as optimum target image blocks 8 for the matching processing for generating the single result maps $R_1$, $R_2$, $R_3$. Accordingly, the single result maps $R_1$, $R_2$, $R_3$ with high reliability are generated.

Further, the template image blocks 7 are given the order representing propriety for which the matching processing is performed in descending order of standard deviation values, and are set as the target image blocks 8, with the result that from an image block with higher reliability, the single result maps $R_1$, $R_2$, $R_3$ are generated. Accordingly, a highly-accurate final offset value can be calculated for a short processing time.

The judgment on stability of the cumulative offset value will be described. For example, with use of the following two parameters, the stability of the cumulative offset value is judged.

Tolerance for judging a cumulative offset value to be "not changed" when the cumulative offset value is compared with the previously-calculated cumulative offset value The number of times representing how many times "not changed" is necessary to be judged in order to determine that a cumulative offset value is stable FIG. 9 are diagrams for explaining the parameter a. As shown in FIGS. 9A, 9B, and 9C, the tolerances are set as appropriate, and the judgment on "changed" and "not changed" of the calculated cumulative offset values are carried out. In other words, as compared to the previously-calculated cumulative offset value, a cumulative offset value whose difference between the x coordinate and the y coordinate is smaller than the tolerance becomes a cumulative offset value included in the tolerance range.

The parameter b. will be described. For example, when the judgment of "not changed" by the parameter a. is successively obtained twice, that cumulative offset value is judged to be stable. Alternatively, the judgment of "not changed" is successively obtained three times, the cumulative offset value is judged to be stable. In other words, the stability of a cumulative offset value is judged using the number of times the judgment of "not changed" is successively obtained, as a standard.

In this manner, when the calculated cumulative offset value meets the conditions defined by the parameters a. and b., it is judged that the cumulative offset value is stable. The cumulative offset value that have been judged to be stable is set as a final offset value of the overlap images A and B (Yes of Step 208). By setting the parameters a. and b. as appropriate, it is possible to set as appropriate a processing time necessary for calculating a final offset value or the accuracy of a final offset value of the overlap images A and B. Parameters different from the parameters a. and b. described in this embodiment may be used.

It should be noted that in a case where the cumulative offset values calculated by cumulatively adding all the single result maps $R_1$, $R_2$, $R_3$ of the selected target image blocks 8 are not judged to be stable (No of Step 208), other target image blocks 8 are selected in Step 205.

As described above, in the PC 100 as an information processing apparatus according to this embodiment, the overlap image A of the source image 1, and the overlap image B of the template image 2 that is superimposed on the overlap image A are each divided into a plurality of areas. Accordingly, a plurality of source image blocks 4 and a plurality of template image blocks 7 are generated. Then, target image blocks 8 are selected from the plurality of template image blocks 7, and single result maps $R_1$, $R_2$, $R_3$ as relative position information of the target image blocks 8 and corresponding image blocks 10 are generated. Based on the single result maps $R_1$, $R_2$, $R_3$, a final offset value as relative position shift information of the overlap image A of the source image 1 and the overlap image B of the template image 2 is calculated. Therefore, the matching processing is unnecessary to be performed on the entire overlap images A and B superimposed on each other, and a user does not need to designate a coincidence point. As a result, it is possible to appropriately connect the source image 1 and the template image 2 with less burden on the user for a short processing time.

(Second Embodiment)

An information processing apparatus according to a second embodiment will be described with an example of a PC. In the following description, the structure and operations that are the same as those of the PC 100 described in the first embodiment will not be described or simply described.

Figure 10:
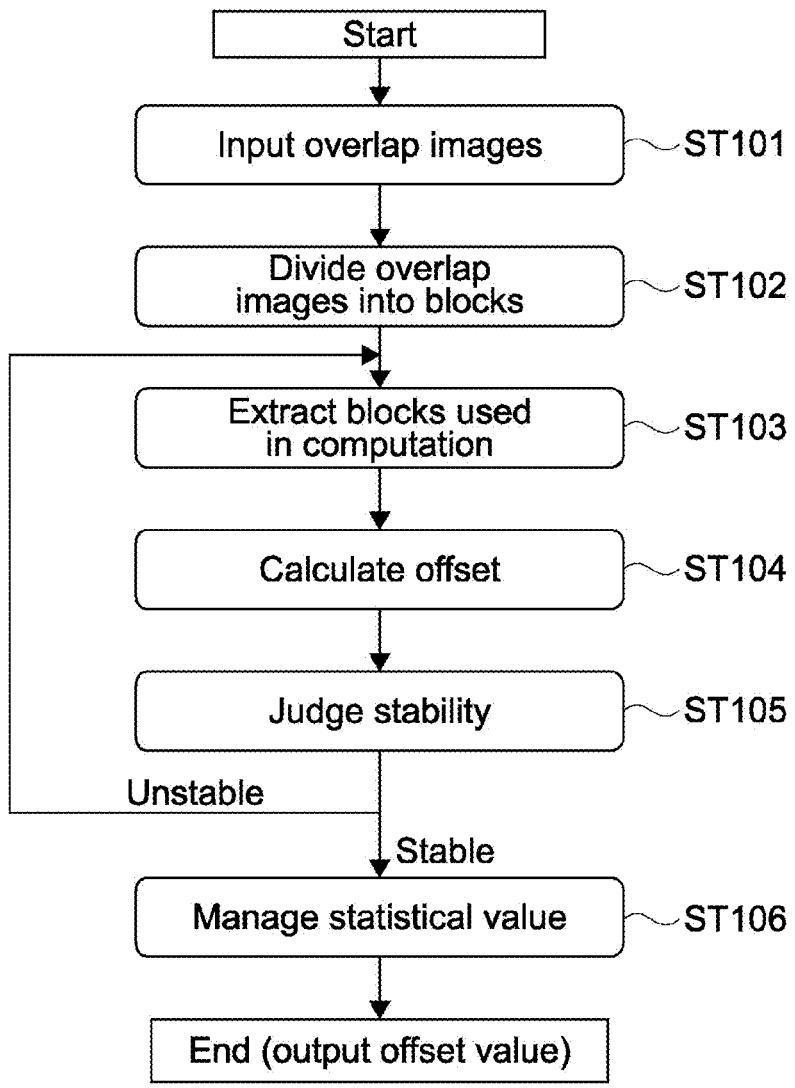
FIG. 10 is a flowchart showing the outline of processing of a PC as an information processing apparatus according to a second embodiment.
Figure 11:
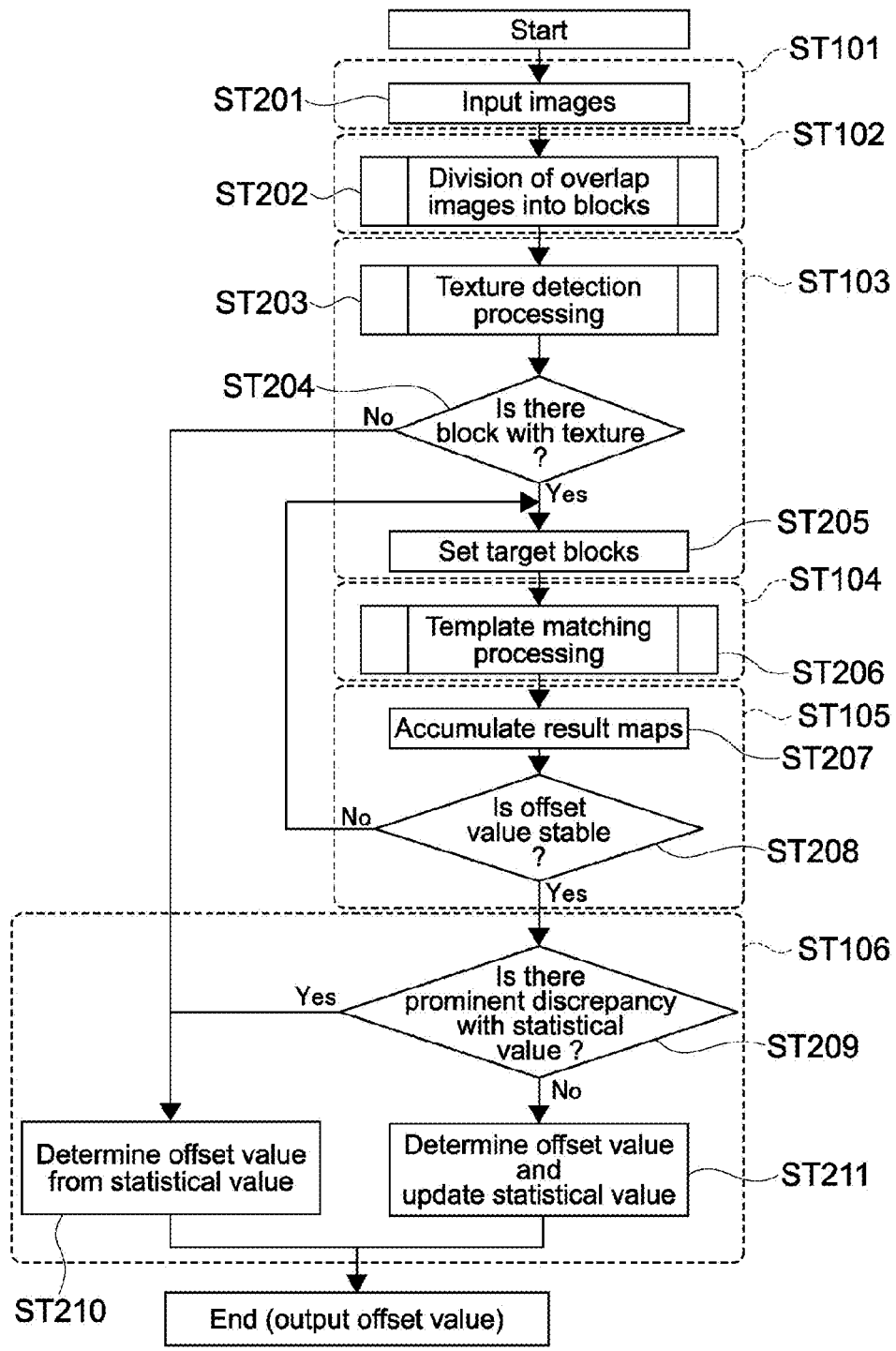
FIG. 11 is a flowchart showing a specific algorithm of each processing shown in FIG. 10.

FIG. 10 is a flowchart showing the outline of processing of a PC as an information processing apparatus according to this embodiment. FIG. 11 is a flowchart showing a specific algorithm of each processing shown in FIG. 10.

As shown in FIGS. 10 and 11, in the PC according to this embodiment, a cumulative offset value that has been judged to be stable by the stability judgment section in Step 105 is output to a statistical value management section.

FIG. 12 are diagrams for explaining the processing of the statistical value management section. For example, as shown in FIG. 12, a subject 11 is photographed separately in nine partial images 12 (numbers 0 to 8 shown in FIG. 12). Then, as shown in FIG. 12A, eight images (numbers 0 to 7) of the nine partial images 12 are connected by the stitching processing described in the first embodiment.

As shown in FIG. 12A, the partial image 12 (number 0) and the partial image 12 (number 1) are connected in the y direction, and a final offset value calculated at this time is (−5,2). The partial image 12 (number 1) and the partial image 12 (number 2) are also connected in the y direction, and a final offset value is (−4,2). The partial image 12 (number 6) and the partial image 12 (number 7) are similarly connected, and a final offset value is (−5,2).

Those three final offset values are cumulatively added, to thereby calculate a direction-offset cumulative value (−14,6). Further, a direction counter value that is the number of cumulative additions is set to 3. The direction-offset cumulative value (−14,6) is divided by the direction counter value of 3, to thereby calculate a direction estimate value (−5,2) as a statistical value. In a case where a direction offset value cannot be divided by the direction counter value, for example, round-off, round-down, round-up, or the like is performed to calculate a statistical value.

In this manner, based on the direction-offset cumulative value obtained by cumulatively adding final offset values calculated in the past for the x direction and the y direction, and the direction counter value that is the number of additions, an average value of final offset values for each connection direction is calculated. The calculated average value is stored as a statistical value.

As shown in FIG. 12B, ninth partial image 12 (number 8) is connected to the partial image 12 (number 7) in the y direction. At that time, the calculated final offset value and the stored statistical value (−5,2) are compared with each other, and it is judged whether a prominent discrepancy is found therebetween (Step 209). For example, in a case where an absolute value of a difference between the final offset value and the statistical value (−5,2) is equal to or larger than a predetermined threshold value, it is judged that there is a prominent discrepancy. As the predetermined threshold value, for example, a value of about 20 is conceived.

In a case where it is judged that there is a prominent discrepancy between the final offset value and the statistical value (−5,2) (Yes of Step 209), as shown in FIG. 12B, the statistical value (−5,2) is applied mutatis mutandis as a final offset value, and the calculated final offset value is not used (Step 210). Accordingly, for example, the case where an inappropriate final offset value is calculated due to a photographing environment at a time when the partial images 12 are photographed, photographed dust or the like that is judged as texture, and the like, can be supported.

Further, assuming that it is judged that no target image blocks 8 having texture, which are optimum for the matching processing, are present in Step 204 shown in FIG. 11, also in this case, the statistical value is applied mutatis mutandis as a final offset value in Step 210.

In a case where it is judged that a prominent discrepancy is not found between the final offset value and the statistical value (−5,2) (No of Step 209), based on the calculated final offset value, the partial image 12 (number 8) and the partial image 12 (number 7) are connected to each other. Then, the final offset value is added to the direction-offset cumulative value, and the direction counter value is incremented (Step 211). Specifically, the direction-offset cumulative value (−14, 6) and the vale 3 of the direction counter value described above are set in the past in Step 211.

FIG. 13 are diagrams showing processing results of the stitching processing according to this embodiment, and those of stitching processing as Comparative example. As shown in FIGS. 13A and 13B, in this case, processing results obtained when a part of an image of an observation target object 13 that is obtained by an optical microscope is photographed separately in nine partial images 12 (numbers 0 to 8), and those images are subjected to the stitching processing are shown. The nine partial images 12 are connected to each other in the order from the partial image 12 (number 0) to the partial image 12 (number 8) in directions indicated by index 1 to index 8.

In the stitching processing as Comparative example, the matching processing is performed on the entire overlap images A and B without dividing the overlap images A and B into blocks. On the other hand, in the stitching processing according to this embodiment, a computation candidate block group 9 is constituted of three target image blocks 8 (see blk of FIG. 13C). In addition, the tolerance for the stability judgment shown in FIG. 9 is set to ±1, and the number of times the stability judgment is performed is set to two.

As shown in FIG. 13C, final offset values obtained by the two types of processing compared to each other are substantially equal values, and differences thereof can be considered to be in a range of the tolerance. In terms of a calculation time period, in the stitching processing according to this embodiment, the total of the calculation time period is 0.648 seconds. Compared with this, the stitching processing of Comparative example takes 7.151 seconds. Specifically, it is found that in the stitching processing according to this embodiment, the calculation time period is short to a large extent and high-speed stitching processing is realized.

Figure 14A:
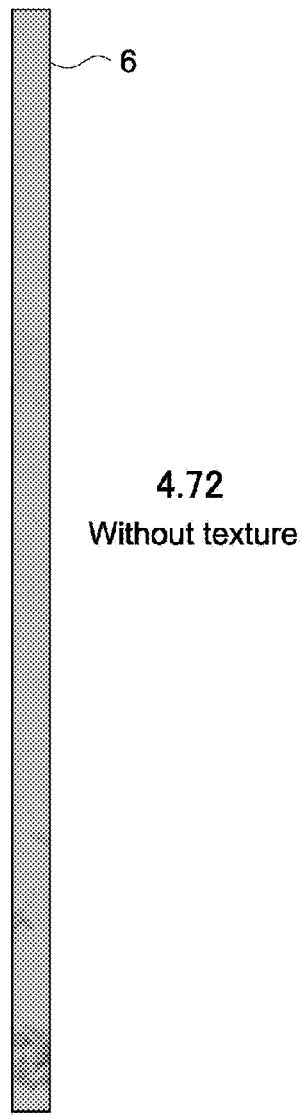
FIG. 14 are diagrams showing a difference between the stitching processing according to the second embodiment and the stitching processing as Comparative example.
Figure 14B:
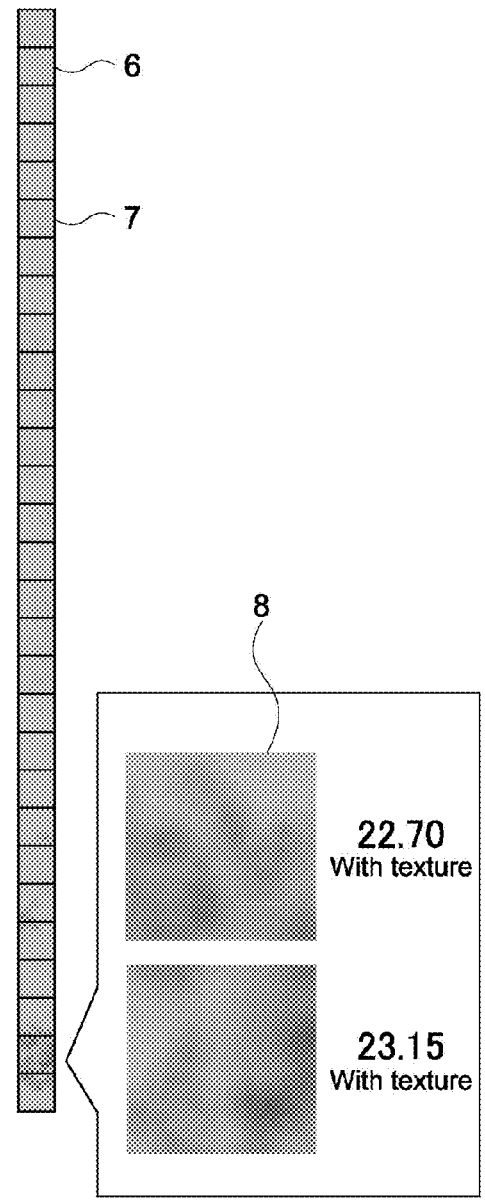

FIG. 14 are diagrams showing a difference between the stitching processing according to this embodiment, and the stitching processing as Comparative example. FIGS. 14A and 14B show the same block area 6 of the template image 2.

In the stitching processing as Comparative example, a standard deviation value of luminance values for the entire block area 6 is calculated, and the presence/absence of texture is judged. Then, the matching processing is performed on the entire block area 6 that is judged to have texture. As shown in FIG. 14A, a standard deviation value of the entire block area 6 is 4.72, which is low. Therefore, highly-accurate matching processing is difficult to be performed with this block area 6. Alternatively, in a case where a threshold value of the standard deviation value is set for the judgment of the presence/absence of texture, it is highly likely that the block area 6 is judged to have no texture. In that case, the block area 6 is not used for the matching processing.

As shown in FIG. 14B, in the stitching processing of this embodiment, the block area 6 is divided into blocks and a plurality of template image blocks 7 are generated. In the template image blocks 7 positioned on the lower side of the block area 6 when viewed in FIG. 14B, standard deviation values become large. Therefore, those template image blocks 7 can be used as target image blocks 8 for calculating a final offset value of the overlap images A and B.

In this manner, in the stitching processing described as Comparative example, a standard deviation value is calculated for the entire block area 6, and this value is set as an index value of the texture judgment. Therefore, for example, in a case where a most part of the block area 6 is plain, the plain area is dominant and a standard deviation value becomes low. As a result, the accuracy of the stitching processing is reduced, or the block area 6 is not used for the stitching processing.

However, in the stitching processing of this embodiment, the block area 6 is divided into blocks and a standard deviation value is calculated for each of the generated template image blocks 7, to thereby judge the presence/absence of texture. Therefore, in a case where minute texture is present, the minute texture is detected with high sensitivity and can be used as a target image block 8 in the stitching processing.

(Third Embodiment)

An information processing apparatus according to a third embodiment will be described with an example of a PC. In this PC, a method of selecting target image blocks is different from that of the PC 100 according to the first embodiment described above.

In the PC 100 of the first embodiment, in Step 205 shown in FIG. 4, a predetermined number of template image blocks having a standard deviation value equal to or larger than a predetermined threshold value is selected as a computation candidate block group. Then, those template image blocks are sorted out in descending order of standard deviation values, and set in the order as target image blocks to be targets of the matching processing.

In the PC according to this embodiment, as a computation candidate block group, a predetermined number of template image blocks having a standard deviation value equal to or larger than a predetermined threshold value is selected as follows. First, a first template image block is selected. Next, on an overlap image of the template image, a second template image that is separate from the first template image block by a predetermined distance (pixel) or more is selected.

In other words, in this embodiment, as a computation candidate block group, the first and second template image blocks that are separated from each other by a predetermined distance or more on the overlap image are selected. For example, a plurality of template image blocks including at least a set of template image blocks separated from each other by a predetermined distance or more may be selected as a computation candidate block group. Alternatively, a plurality of template image blocks including two arbitrary template image blocks separated from each other by a predetermined distance or more may be selected as a computation candidate block group.

From the computation candidate block group thus selected, target image blocks are set in descending order of standard deviation values. Accordingly, on the overlap image of the template image, a single result map is generated without positional displacement. As a result, based on the generated single result map, a final offset value can be calculated accurately.

The stitching processing performed by the information processing apparatus according to the embodiments described above is used in a system that digitizes an image of a cell, a tissue, an organ, or the like of a living body, which is captured by an optical microscope, for example, in the field of medicine or pathology, to examine the tissue or the like by a doctor or a pathologist or diagnose a patient based on the digitized image, or other systems. However, it is confirmed that the stitching processing is also applicable to many materials other than the cell, the tissue, the organ, or the like of the living body, and accordingly the stitching processing is also applicable to other fields in addition to the field of medicine or the like. In addition, the stitching processing in the embodiments described above is also applicable to other digital images, without being limited to the images captured by the optical microscope.

(Other Embodiments)

Embodiments according to the present application are not limited to the embodiments described above, and other various embodiments may be possible.

In the embodiments described above, the PC is exemplified as the information processing apparatus. However, a scanner apparatus having a function of an optical microscope may be used as an information processing apparatus according to this embodiment, and the stitching processing may be performed with the scanner apparatus or the like.

As shown in FIG. 5, in the first embodiment described above, a setting is made such that the offset value is set to (0,0) and the template image block 7 is positioned at the center of the source image block 4 when the overlap images A and B are superimposed on each other. However, a relative positional relationship at this time between the source image block 4 and the template image block 7 can be set as appropriate. For example, in a case where a setting is made such that the template image block 7 is positioned at the upper left corner of the source image block 4, a position R(x,y) and an image block offset value (x,y) of the single result map shown in FIG. 7 are calculated as the same value, with the result that the processing time can be shortened.

The size and shape of the source image block and the template image block may be set as appropriate. For example, the size of the source image block and that of the template image block may be identical to each other as long as a relationship between the image block offset value and the final offset value can be grasped.

As shown in FIG. 6, in the first embodiment described above, in order to select an optimum target image block for the matching processing, a standard deviation value of luminance values for each template image block is calculated. However, an indicator for selecting an optimum target image block for the matching processing is not limited to the standard deviation value. For example, a target image block may be selected based on an amount of high frequency components for each template image block. Alternatively, a target image block may be selected based on a difference between a maximum luminance value and a minimum luminance value of a template image block, that is, the magnitude of a dynamic range. In addition, a target image block may be selected based on various types of information relating to contrast of luminance values.

As shown in FIG. 12, the subject 11 is photographed separately in the nine partial images 12, and a statistical value is calculated based on a final offset value calculated when the partial images 12 are connected. Other embodiment in which such a statistical value is used will be described.

For example, it is assumed that an image of an observation target object that is captured by an optical microscope is photographed by a digital system, and the digital image is subjected to stitching processing by the information processing apparatus according to the embodiments described above. A light source or an optical system of the optical microscope can be managed, and a constant photographing condition can be maintained in a chronological order or on a space. Therefore, if a statistical value in the past stitching processing is calculated for each predetermined photographing condition, the statistical value can be used when different observation target objects are photographed under the same photographing condition, and images thereof are subjected to the stitching processing.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing apparatus, comprising:
   a generation means for generating a plurality of source image blocks obtained by dividing a connection area of a source image into a plurality of areas, and a plurality of template image blocks obtained by dividing a connection area of a template image into a plurality of areas, the connection area of the template image being superimposed on the connection area of the source image;
   a selection means for selecting a plurality of target image blocks as targets individually subjected to matching processing, based on luminance information of each of the template image blocks generated by the generation means;
   a matching processing means for calculating, by performing the matching processing on corresponding image blocks as images corresponding to the plurality of target image blocks selected by the selection means, in the plurality of source image blocks generated by the generation means, and the plurality of target image blocks, relative position information of the corresponding image blocks and the target image blocks; and
   a calculation means for calculating relative position shift information of the connection area of the source image and the connection area of the template image, based on the relative position information calculated by the matching processing means, wherein
   the generation means generates the plurality of template image blocks that correspond to the plurality of source image blocks and have a smaller size than that of the plurality of source image blocks,
   the matching processing means generates a correlation coefficient that is based on luminance information of each of the corresponding image blocks and luminance information of each of the target image blocks in accordance with a position of each of the target image blocks within each of the corresponding image blocks, to thereby perform the matching processing, and calculates the generated correlation coefficient as the relative position information, and
   the calculation means calculates the relative position shift information by cumulatively adding the correlation coefficients of the target image blocks, the correlation coefficients being calculated by the matching processing means.

2. The information processing apparatus according to claim 1, wherein
   the calculation means generates tentative position shift information by cumulatively adding the correlation coefficients of the target image blocks, and calculates, when the tentative position shift information included in a tolerance set in advance is generated continuously by a predetermined number of times, the tentative position shift information included in the tolerance as the relative position shift information.

3. The information processing apparatus according to claim 1, wherein
   the selection means calculates a standard deviation value of luminance values for each of the template image blocks, and selects the template image blocks having the standard deviation value equal to or larger than a predetermined threshold value, as the target image blocks.

4. The information processing apparatus according to claim 3, wherein
   the selection means gives a first priority order to the template image block having a first standard deviation value, the first priority order representing a priority for which the matching processing is performed by the matching processing means, gives a second priority order to the template image block having the standard deviation value smaller than the first standard deviation value, the second priority order having the priority lower than the first priority order, and selects the template image block to which the first priority order is given and the template image block to which the second priority order is given, as the target image blocks.

5. The information processing apparatus according to claim 1, wherein
   the selection means selects a first template image block and a second template image block that is separated from the first template image block by a predetermined distance or more in the connection area of the template image, as the target image blocks.

6. An information processing method executed by an information processing apparatus, comprising the steps of:
   generating, by the information processing apparatus, a plurality of source image blocks obtained by dividing a connection area of a source image into a plurality of areas, and a plurality of template image blocks obtained by dividing a connection area of a template image into a plurality of areas, the connection area of the template image being superimposed on the connection area of the source image, wherein the plurality of template image blocks that correspond to the plurality of source image blocks have a smaller size than that of the plurality of source image blocks;
   selecting, by the information processing apparatus, a plurality of target image blocks as targets individually subjected to matching processing, based on luminance information of each of the generated template image blocks;
   calculating, by the information processing apparatus, by performing the matching processing on corresponding image blocks as images corresponding to the selected target image blocks, in the generated source image blocks, and the plurality of target image blocks, relative position information of the corresponding image blocks and the target image blocks; and
   calculating, by the information processing apparatus, relative position shift information of the connection area of the source image and the connection area of the template image, based on the calculated relative position information, wherein a correlation coefficient is generated that is based on luminance information of each of the corresponding image blocks and luminance information of each of the target image blocks in accordance with a position of each of the target image blocks within each of the corresponding image blocks, to thereby perform the matching processing, wherein the generated correlation coefficient is calculated as the relative position information, and wherein the relative position shift information is calculated by cumulatively adding the correlation coefficients of the target image blocks, the correlation coefficients being calculated by matching processing.

7. A non-transitory computer readable medium storing a program causing an information processing apparatus to execute:

generating a plurality of source image blocks obtained by dividing a connection area of a source image into a plurality of areas, and a plurality of template image blocks obtained by dividing a connection area of a template image into a plurality of areas, the connection area of the template image being superimposed on the connection area of the source image, wherein the plurality of template image blocks that correspond to the plurality of source image blocks have a smaller size than that of the plurality of source image blocks;

selecting a plurality of target image blocks as targets individually subjected to matching processing, based on luminance information of each of the generated template image blocks;

calculating, by performing the matching processing on corresponding image blocks as images corresponding to the selected target image blocks, in the generated source image blocks, and the plurality of target image blocks, relative position information of the corresponding image blocks and the target image blocks; and calculating relative position shift information of the connection area of the source image and the connection area of the template image, based on the calculated relative position information, wherein a correlation coefficient is generated that is based on luminance information of each of the corresponding image blocks and luminance information of each of the target image blocks in accordance with a position of each of the target image blocks within each of the corresponding image blocks, to thereby perform the matching processing, wherein the generated correlation coefficient is calculated as the relative position information, and wherein the relative position shift information is calculated by cumulatively adding the correlation coefficients of the target image blocks, the correlation coefficients being calculated by matching processing.

* * * * *